Jan. 31, 1956 A. E. BALLARD 2,733,128
PROCESS FOR THE RECOVERY OF U IN THE PRESENCE OF IRON
Filed Sept. 18, 1945
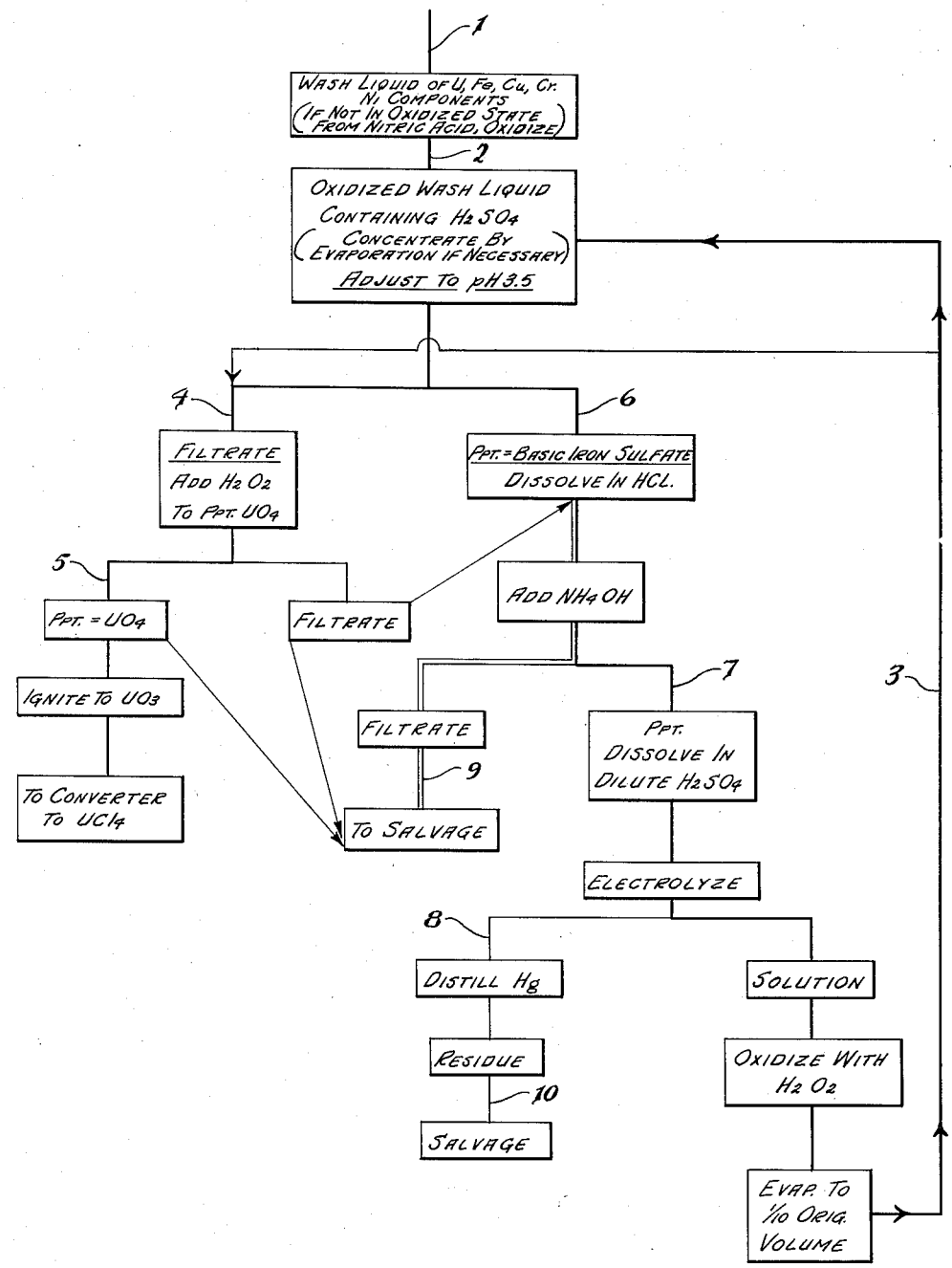
INVENTOR.
Albert E. Ballard
BY

United States Patent Office 2,733,128
Patented Jan. 31, 1956

2,733,128
PROCESS FOR THE RECOVERY OF U IN THE PRESENCE OF IRON

Albert E. Ballard, Oak Ridge, Tenn., assignor, by mesne assignments, to the United States of America as represented by the United States Atomic Energy Commission Application September 18, 1945, Serial No. 617,126

6 Claims. (Cl. 23—14.5)

This invention relates to the separation and recovery of U. More particularly, the invention relates to the recovery of enriched U from wash solutions or comparable liquids containing the enriched U in the presence of various extraneous materials such as a substantial content of Fe.

The production or obtaining of enriched U and solutions, or liquids containing the U, is not a part of the present invention, but is the invention of others. Detailed disclosure is contained in a number of copending applications exemplified by Carter et al., Ser. No. 532,159, filed April 21, 1944, and Kamen, Ser. No. 532,160, filed April 21, 1944 and in other copending applications to which reference may be made for further information relative to the production of enriched U, illustrative compositions of the various materials obtained and other details. The present invention is not limited to the treatment of any particular source of a liquid containing enriched U, but is particularly applicable to the types of solutions containing contents of Fe obtained in processes of the type described in the aforementioned copending applications.

It is sufficient to point out that in a number of existing processes there results or in connection with such processes liquids are obtained having a content of valuable U therein which it is desired to recover. This U is of great value since the isotopic composition thereof as respects certain of the isotopes may be much higher than the isotopic composition of natural U. As is known, natural U contains a small amount of $U^{235}$, an amount of $U^{238}$ approximately 139 times greater than the first-mentioned U, together with $U^{234}$, $UX^1$ and other components. By the term "enriched," or "enhanced U" as used herein, reference is made to materials in which the content of the first-mentioned isotope is larger than in natural U whether the U be in the elemental form or in a compound, or is in some other form.

However, this valuable U in the liquids of the class aforementioned may be in the presence of a large amount of extraneous material. While such extraneous material may of itself have possible value, its value may be regarded as negligible as compared with the U. Hence, for the purposes of the present invention such other material may be regarded as undesirable. It happens in many instances that this extraneous material may be many times greater than the content of the valuable U which it is desired to recover. For example, in instances where the present invention is very useful, the content of the Fe in the extraneous material may be many times larger than the content of U. That is, as explained in detail in the aforementioned copending applications, the liquids containing valuable U also contain extraneous material comprising metallic and non-metallic components such as iron, chromium, nickel, carbon, and the like. The presence of these other components may be due to some extent to contamination in the original raw materials, but usually extraneous material is picked up during the methods of producing the enriched U, or in the various washing methods used in such processes for washing the U from stainless steel, or other parts of isotope separation apparatus.

For example, while materials which may be treated in accordance with the present invention may contain from 5 to 1200 milligrams or more of U per liter, there may be present many more milligrams of iron, chromium, and nickel. Because of the presence of these other components which may be in high amounts, separation and recovery of the valuable U presents a considerable problem.

I have found, as will be described in detail hereinafter, that separation and recovery of valuable U in the presence of Fe may be accomplished by a procedure involving precipitating the bulk of the Fe in a novel manner, separating and processing the precipitate to prevent any small loss of U therein, and processing the liquid freed of Fe to separate the U therefrom and also thereby eliminating other contaminants.

While certain of the individual steps of my process, such as the electrolysis step to be described, may be similar to prior procedures which are the inventions of others, it is believed that the combination of steps described herein is novel. It is also believed that the step herein of eliminating Fe as a relatively easily filterable precipitate, described as a basic iron sulfate, is novel per se, as are other aspects of my process which will be described.

One object of the present invention is to provide a method for the separation and recovery of valuable U materials particularly enhanced or enriched U.

Another object is to provide a separation and recovery method which may be applied to liquids containing enriched U in the presence of other components, particularly contents of iron and other extraneous material and the like, whether these other components be present in relatively small amounts or present in quantities which exceed the quantity of the valuable U.

Still another object is to provide a method for the separation and recovery of enriched U from liquids containing the U in the presence of substantial amounts of Fe whereby substantially all of the U is recovered without material loss of the U along with the iron.

Still another object is to provide a method for the precipitating, in an environment of the class described, of an easily separable iron precipitate.

Another object is to provide a method of precipitating a basic iron sulfate in the presence of valuable U materials.

Other objects will appear hereinafter.

The composition of the liquids containing the U may vary over wide limits, and reference may be made to the aforementioned copending applications or companion application now Ser. No. 32,832, filed June 14, 1948, for further details relative to the composition of such liquids. It is sufficient for the purposes of the present description to point out that in general the liquids which are particularly susceptible of treatment in accordance with the present invention, in addition to containing the U which it is desired to recover ultimately as the peroxide also contain an undesired content of iron. This iron if precipitated in substantial quantities as the hydroxide often forms a gummy, sticky, non-filterable mass which may not be completely separable. A certain amount of U may be lost along with such iron precipitates. If any great amount of iron carries through to the U peroxide precipitation step, such iron may interfere with this step. By the present invention such difficulties are overcome.

A general understanding of my process may be had by reference to the attached drawing forming a part of the present application. This drawing is in the nature of a flow sheet illustrating a general combination of steps in accordance with one embodiment of my invention which may be applied to liquid containing U in the presence of iron and other extraneous matter for separating the desired U.

Referring now to the drawing, 1 represents a source of the wash liquid which is to be processed containing the U and the iron. In the usual situation this liquid is in the oxidized state because of the presence of nitric acid. However, in the event that it is not in such state, it may be oxidized by the addition of nitric acid and peroxide or by other procedure.

This oxidized wash liquid at 2 if not containing sulfate ion may have sulfate ion incorporated by adding sulfuric acid or sodium acid sulfate or other sources of sulfate ion. For example, the liquid returned by step 3 contains sulfate ions. The volume of the solution is reduced by concentration to preferably a 3–4% solution; however, a more dilute solution such as a 1% solution, based on the U component present, may be processed but involves the handling of larger liquid volumes. Also in step 2, the pH of the solution is carefully adjusted to about 3.5 by suitable additions.

It has been found that by carefully controlling the pH at this point, the iron present may be precipitated in the form of a readily filterable material described herein as basic iron sulfate. The exact composition of this iron precipitate is not known at present. It is possible that the precipitate formed under these conditions may comprise a mixture of iron hydroxide and iron sulfate. In any event, however, it has been found that by precipitating the iron under the conditions described a readily separable precipitate is obtained as contrasted to the gummy, sticky and relatively non-filterable material which is obtained if an iron hydroxide is precipitated rather than the basic sulfate type of precipitate described herein which is precipitated by the presence of both sulfate ions and hydroxyl ions under the pH conditions described.

It will be noted in passing that, to the liquid at 2, there may be recycled recovered liquid as indicated at 3 to supply sulfate ion. This aspect will be described in detail hereinafter.

The easily separable basic iron sulfate precipitate in 2 may be filtered or centrifuged out and the liquid, containing U freed of its iron content as well as of other metallic contaminants, is conducted to step 4 where it is treated with hydrogen peroxide to precipitate uranium peroxide. By this step the U is separated from any small amounts of extraneous materials such as copper, chromium, nickel, and the like still therein so that the precipitate at 5 is a relatively pure uranium peroxide precipitate. That is, usually a substantial amount of these other impurities such as copper, chromium and the like follow along with the basic iron sulfate, as will be apparent, and are later separated. This precipitate may be further processed, as by ignition, to obtain a lower oxide which may be converted to a halide. Such further treatment of the uranium peroxide precipitate is merely illustrative and is not a limitation upon the present invention. The ignition of the oxide and its conversion to the halide may be in accordance with procedures worked out by others, such as by the methods described in other copending applications.

The filtrates and washings from the steps of forming the uranium peroxide and washing the uranium peroxide precipitate may contain a very small amount of U and for complete recovery may be conducted to salvage designated 9, or to the recovery step designated 6.

Referring now to step 6 wherein the basic iron sulfate precipitate has been segregated, this precipitate may carry along a small amount of U. The basic iron sulfate precipitate is redissolved in a suitable solvent such as hydrochloric acid as indicated under step 6. Ammonium diuranate is precipitated from this hydrochloric acid solution by means of the addition of ammonium hydroxide, the bulk of the U being in this precipitate at step 7.

The filtrate from this step is substantially free of any U, but may be conducted to the salvage step 9. All of these salvage materials 9 and 10, the latter to be described hereinafter, may be treated by any suitable salvage operation, the exact details of which are not a part of the present invention and represent the work of others. For example, one salvage method is the fluorination method described in Smith copending application Ser. No. 596,226, filed May 28, 1945.

Considering the precipitate comprising ammonium diuranate formed in step 7, this precipitate may be redissolved and processed to isolate the uranium therein. The isolated uranium is returned to an earlier phase of the process by step 3, as for example, to step 2 if it is still not pure, but usually it may be added to step 4 et seq. One method of processing these solutions resulting from dissolving the ammonium diuranate of step 7 is by electrolysis of a sulfuric acid solution in the presence of a mercury cathode. The details of such electrolytic methods represents the work of others and are described in the copending application in the name of Kamen, Ser. No. 532,160, previously referred to herein.

By such electrolysis any small amount of uranium which followed the Fe is recovered and may be converted to an oxidized solution suitable for adding to the oxidized solution at 2. The mercury employed in the electrolysis step may pick up a small amount of impurities and is processed by distillation as indicated at 8, the residues being sent to salvage 10.

In the above type of process it has been found that by eliminating the iron content at the onset as an easily separable precipitate, the subsequent precipitation and recovery of U as the peroxide are greatly facilitated. As a matter of fact practically the entire bulk of the U is recovered at steps 4 and 5. However, in view of the substantially closed system worked out, any small amount of U following the basic iron sulfate precipitate in step 6 or the various filtrates to step 9, or with the mercury in step 10 are recoverable and returnable to the process; hence, possibilities of any losses in the overall process are minimized. Therefore, there can be no substantial loss of U in this recovery process. Since the precipitation of the basic iron sulfate is relatively rapid, there is no holdup of large quantities of the U, but as indicated, the bulk of the U is immediately recoverable in steps 4 and 5. Any amounts of U recovered in the steps 6, 7, 8, 9 and 10 are small and consequently hold up of the valuable U in these other steps is reduced to a minimum.

A further more detailed understanding of my invention may be had by a consideration of the following example which may be regarded as applied to approximately 500 gallons of liquid containing U resulting from washing certain stainless steel parts with a weak nitric acid solution and steam. However, in addition to the content of the U which it was desired to recover, the nitric acid liquid also contained a substantial amount of iron, presumably picked up from the stainless steel parts of the isotope separation apparatus, as well as contents of chromium, nickel and copper. The operations in this example were as follows:

The wash liquids obtained as above indicated by scrubbing and washing the various apparatus parts with suitable solvents were placed in a conventional stainless steel jacketed tank. These solutions, which contained nitric acid, were concentrated by evaporation, to about a 3%–4% solution. The solution contained, for example, $UO_2^{++}$, $Fe^{+++}$, $Cr^{+++}$, $Ni^{++}$ and $Cu^{++}$ ions.

A source of $SO_4^=$ ions (added as $H_2SO_4$) was supplied, then the pH was adjusted to 3.5 with $NH_4OH$. This caused the precipitation of basic iron sulfate. The $NH_4OH$ addition was made slowly with stirring and an easily filterable precipitate settled out. This precipitate was filtered out and conducted to recovery which included electrolytic treatment, as will be described.

Then $H_2O_2$ was added to the filtrate from the preceding step to precipitate $UO_4.12H_2O$. The pH was adjusted to about 2 by the addition of $NH_4OH$ after the addition of $H_2O_2$. The resultant slurry was let stand for 15-30 minutes to promote crystal growth and then centrifuged. The supernatant from this step was sent to salvage but contains only a very small amount of U.

The precipitate of $UO_4.12H_2O$ was washed, and the washings added to the materials for salvage. The precipitate was dried and then calcined to $UO_3$ which was used for reconversion to U chlorides.

The precipitate of basic iron sulfate in this example contained about 1% of the U started with. The precipitate was dissolved in HCl, then the U therein and other metals were precipitated with excess $NH_4OH$. This U precipitate was digested, centrifuged out and washed. The filtrates and washings were saved for salvage. This U precipitate comprised $(NH_4)_2U_2O_7$, $Fe(OH)_3$, $Cr(OH)_3$, $Cu^{++}$, $Ni^{++}$ and $Mn^{++}$. This precipitate was dissolved in $H_2SO_4$ and subjected to electrolysis, using a mercury cathode by the method of Ser. No. 532,160 aforementioned, thereby removing substantially all impurities of Fe, Cr, Ni and Cu away from this U incidentally thrown down in the basic iron sulfate precipitate. The resultant solution, containing $U^{+4}$, from this step was returned to the peroxide precipitation step above described.

The dirty Hg from this step was distilled to recover pure Hg for reuse. Any residue of Fe or the like from the distillation may contain traces of U, and was saved for salvage. All the salvage solutions from the above steps were evaporated to dryness to hold for eventual recovery of traces of U.

In the above example, about 99% of the U was quickly separated as the peroxide. The 1% U which was diverted along with the basic iron sulfate constitutes a small holdup, as do the very small amounts in the salvage residues. However, since these small amounts may be ultimately recovered, the overall recovery is substantially quantitative.

In the above description certain details have been set forth for illustrating preferred conditions. That is, the use of HCl solvent in some instances, $HNO_3$ in other instances, and an Hg cathode have been described. However, variations may be made such as using $H_2SO_4$ for the solvent or other methods of electrolysis may be employed. Likewise, while concentration of the liquid to a 3% or 4% solution is preferred, 1% to 8% concentration may also be used. While a pH of 3.5 is preferred in forming the basic iron sulfate, operable results may be obtained while using higher and lower values as, for example, within the range of 3 to 3.8. It is, however, an essential part of the present invention that the bulk of the Fe be removed early in the process as the easily separable basic iron sulfate, thereby giving a liquid freed of Fe from which the greater part of the U may be easily recovered.

It is to be understood that all matters contained in the above description and examples are illustrative only and do not limit the scope of this invention as it is intended to claim the invention as broadly as possible in view of the prior art.

I claim:

1. The process of recovering U from liquids containing U nitrate in the presence of undesired components including at least the iron component of the group consisting of iron, copper, chromium, and nickel compounds which comprises concentrating the liquid, removing at least the greater part of the iron component by treating the liquid with a source of a sulfate ion and under controlled pH conditions of about 3.0 to 3.8 whereby a precipitate of the iron is thrown down, thereafter subjecting the liquid freed from the bulk of the iron to treatment for recovering the U component, dissolving the iron precipitate, subjecting the resulting solution to electrolysis for plating out the various metallic contaminants therein, away from the U and returning the U from this step to the aforementioned U recovery step.

2. The process of recovering U from liquids containing U nitrate in the presence of extraneous components including iron which comprises concentrating the liquid to between 1%-8% with respect to the U content, removing at least the bulk of the iron component by treating the solution with a source of a sulfate ion and under controlled pH conditions of about 3.0 to 3.8, thereby causing an easily separable iron precipitate to form, separating and dissolving the resultant precipitate, thereafter subjecting the liquid freed from the iron component to treatment for recovering the U component by precipitation, separating the filtrate from this precipitation step and combining it with the solution obtained by dissolving the aforementioned iron precipitate and thereafter subjecting these liquids to treatment for recovering any small amount of U therefrom whereby substantially quantitative overall recovery is accomplished.

3. The process of recovering U from liquids containing U nitrate in the presence of undesired components including iron, copper, chromium, and nickel nitrates which comprises concentrating the solutions to between 1%-8% with respect to the U content, removing the iron component by treating the liquid with a source of a sulfate ion and under controlled pH conditions of about 3.5, separating the resultant precipitate, thereafter subjecting the filtrate from the preceding step to precipitation treatment for recovering the U component, separating the filtrate from this precipitation step and combining it with the solution obtained by dissolving the aforementioned iron precipitate, subjecting this solution to precipitation treatment with ammonia to obtain precipitates of iron, chromium, and other metal hydroxides, redissolving these precipitates in sulfuric acid, subjecting the resultant solution to electrolysis for plating out the various metallic contaminants including the iron and copper, away from the U, returning the U from this step to the aforementioned U precipitation and returning the sulfuric acid solution from the electrolysis step to the aforementioned precipitation under controlled pH conditions.

4. The process of recovering U from wash solutions containing U in the presence of components including iron, copper, chromium, and nickel which comprises concentrating the solutions, removing at least a substantial amount of the iron component by treating the solution under pH conditions of about 3.5 whereby a basic iron sulfate is precipitated, separating the resultant precipitate, thereafter subjecting the filtrate from the preceding step to precipitation treatment for throwing down the U component as a peroxide, separating the supernatant from this precipitation step and combining it with the solution obtained by dissolving the aforementioned iron precipitate, subjecting this solution to precipitation treatment to obtain precipitates of any U, and any residual iron and chromium, redissolving these precipitates in acid, subjecting the resultant solution to electrolysis for plating out the various metallic contaminants including iron and chromium, away from the U, and returning the U from this step to the aforementioned U precipitation.

5. The process of recovering U from solutions containing U nitrate in the presence of components including iron which comprises concentrating the solutions, removing the iron component by treating the solution with a source of a sulfate ion and under controlled pH conditions of about 3.5, separating the resultant precipitate, thereafter subjecting the filtrate from the preceding step to precipitation treatment for throwing down the U component, separating the supernatant freed of iron from this precipitation step and combining it with the solution obtained by dissolving the aforementioned iron precipitate, subjecting this solution to precipitation treatment with ammonia to obtain another precipitate, redissolving this precipitate in sulfuric acid, subjecting the resultant solution to electrolysis for plating out metallic contaminants away from the U, returning the U from this step to the aforementioned U precipitation and returning the sulfuric acid solution from the electrolysis step to the aforementioned iron precipitation.

6. The process for the recovery of enhanced U from liquids containing the U in the presence of extraneous components including a content of iron which comprises treating the liquid with sulfuric acid and adjusting the pH to about 3.5 to throw down at least the bulk of the iron as an easily separable basic iron sulfate precipitate whereby a supernatant liquid freed of iron containing at least 95% of said U is obtained, immediately treating the supernatant liquid to precipitate the U, treating the basic iron sulfate precipitate by procedure including electrolysis to recover any small amount of U therein and combining this recovered U with the U in the supernatant whereby a high overall U recovery is obtained.

References Cited in the file of this patent

UNITED STATES PATENTS

| | | |
|---|---|---|
| 691,324 | Ramage | Jan. 14, 1902 |
| 1,050,796 | Bleecker | Jan. 21, 1913 |
| 2,079,602 | Crist | May 11, 1937 |

OTHER REFERENCES

Hydrogen Ions, by H. T. Britton, D. Van Nostrand Co., N. Y. (1929), pages 275–278 and 281–283.